United States Patent [19]

Ueno et al.

[11] Patent Number: 4,467,758
[45] Date of Patent: Aug. 28, 1984

[54] SPLIT ENGINE

[75] Inventors: Makoto Ueno, Shizuoka; Kohei Hori, Susono, both of Japan

[73] Assignee: Toyota Jidosha Kabushiki Kaisha, Toyota, Japan

[21] Appl. No.: 475,622

[22] Filed: Mar. 15, 1983

[30] Foreign Application Priority Data

Oct. 22, 1982 [JP] Japan .................. 57-184431

[51] Int. Cl.³ ............................. F02D 17/02
[52] U.S. Cl. ................. 123/198 F; 123/481; 123/571
[58] Field of Search ............ 123/198 F, 481, 571

[56] References Cited

U.S. PATENT DOCUMENTS 4,106,471 8/1978 Nakajima et al. .......... 123/198 F
4,344,393 8/1982 Etoh et al. .................. 123/198 F
4,365,598 12/1982 Sugasawa .................. 123/198 F

FOREIGN PATENT DOCUMENTS 55-69736 5/1982 Japan .

Primary Examiner—Ira S. Lazarus
Attorney, Agent, or Firm—Finnegan, Henderson, Farabow, Garrett & Dunner

[57] ABSTRACT

A split engine comprising a plurality of cylinders divided into a first cylinder group and a second cylinder group. The second cylinder group is connected to the outside air via a second surge tank. A throttle valve is arranged in the inlet of the second surge tank. The first cylinder group is connected to the second surge tank. A shut-off valve is arranged in the connecting portion of the first surge tank and the second surge tank. The first surge tank is connected to the exhaust manifold of the engine via an exhaust-gas recirculation passage. The recirculation control valve is arranged in the exhaust-gas recirculation passage. When the level of the load of the engine becomes higher than a predetermined level, the shut-off valve opens, and the recirculation control valve closes. At this time, if the opening speed of the throttle valve is lower than a predetermined speed, the opening operation of the shut-off valve is started when the closing operation of the recirculation control valve is completed. However, if the opening speed of the throttle valve is higher than the predetermined speed, the opening operation of the shut-off valve is started when the closing operation of the recirculation control valve is started.

17 Claims, 14 Drawing Figures

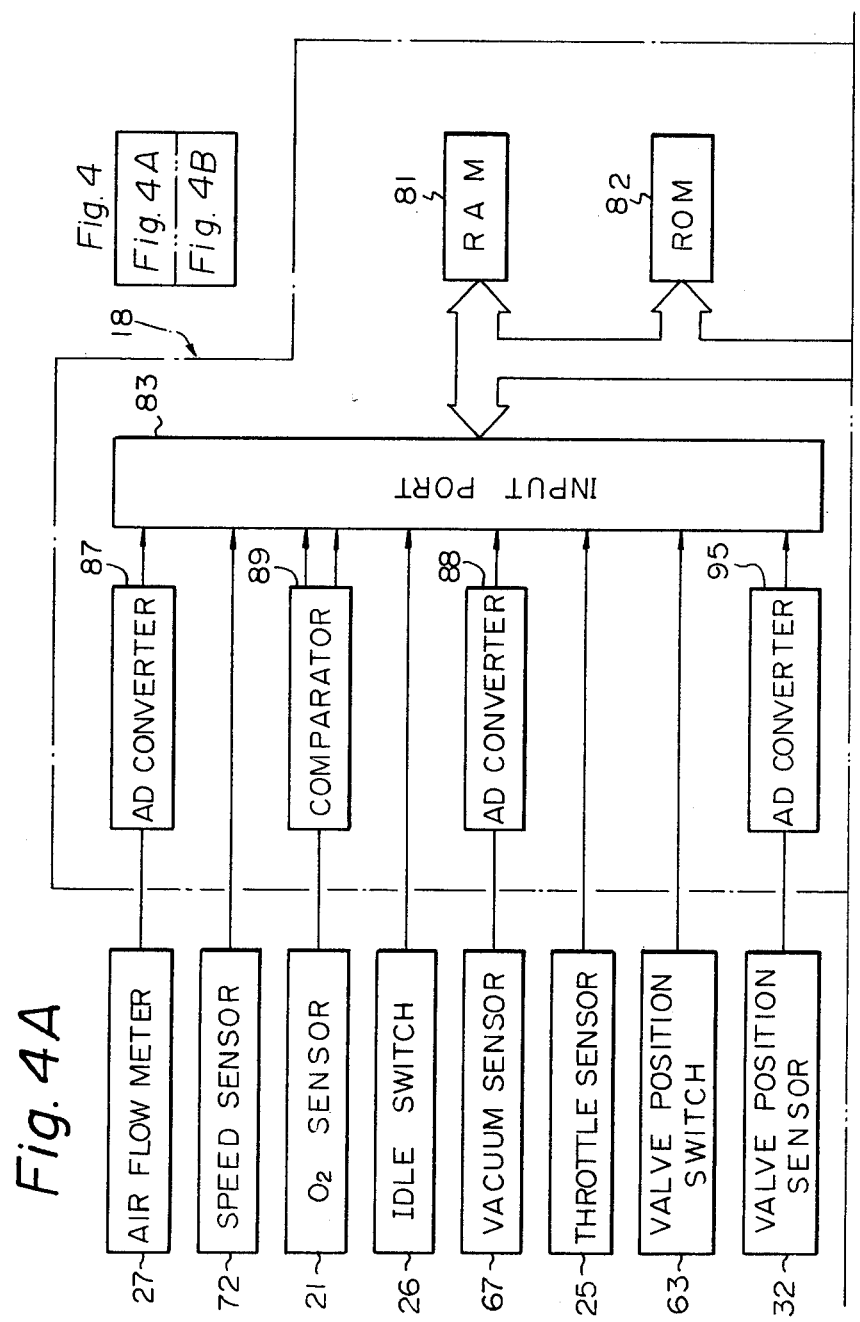

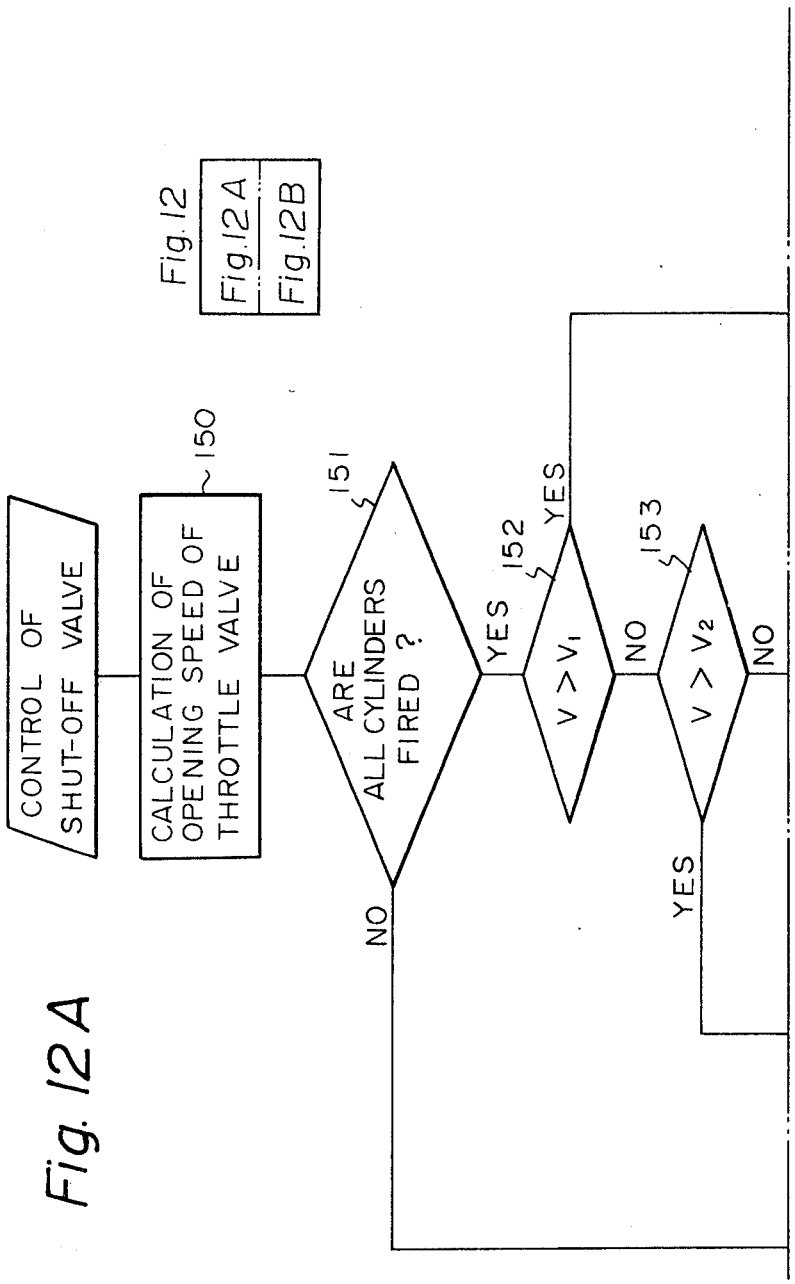

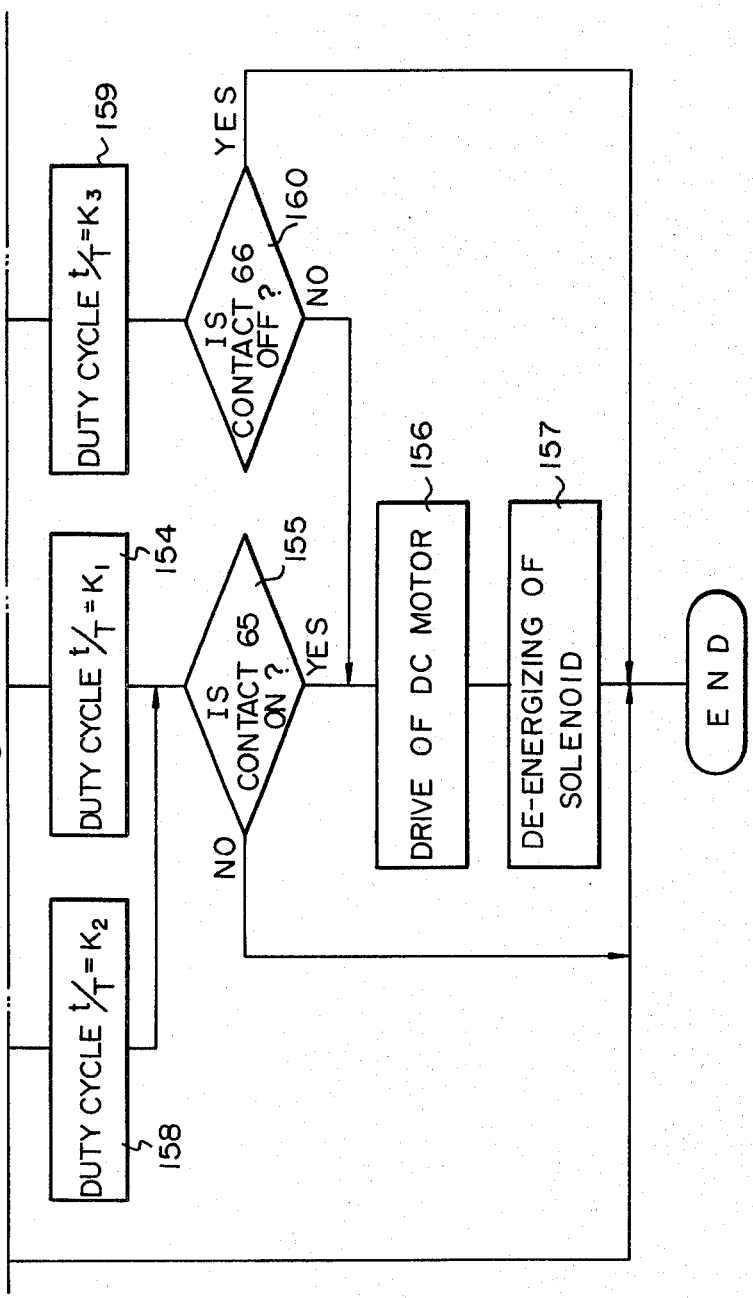

SPLIT ENGINE

BACKGROUND OF THE INVENTION

The present invention relates to a split engine.

In an internal-combustion engine in which the load of the engine is controlled by a throttle valve, a specific fuel consumption deteriorates as the degree of opening of the throttle valve is reduced. Consequently, in order to improve the specific fuel consumption, a split engine as disclosed in Japanese Unexamined Patent Publication (Kokai) No. 55-69736 has been devised in which, when the engine is operating under a light load, part of the cylinders of the engine are not fired while the remaining cylinders operate under a heavy load. As is illustrated in FIG. 1, in this type of engine, the cylinders are divided into a first cylinder group A and a second cylinder group B, and a first intake manifold 1 and a second intake manifold 2 are connected to the first cylinder group A and the second cylinder group B, respectively. The first intake manifold 1 and the second intake manifold 2 are connected to the outside air via a common throttle valve 3, and a shut-off valve 4 is arranged in the air inlet of the first intake manifold 1. The first intake manifold 1 and an exhaust manifold 5 are interconnected to each via an exhaust-gas recirculation passage 6, and a recirculation control valve 7 is arranged in the exhaust-gas recirculation passage 6. In the split engine, when the engine is operating under a light load, the injection of fuel by fuel injectors 8 is stopped, and the shut-off valve 4 is closed. In addition, the recirculation control valve 7 is open, and the cylinders of the second cylinder group B operate under a heavy load. Contrary to this, when the engine is operating under a heavy load, the shut-off valve 4 is open, and the recirculation control valve 7 is closed. In addition, fuel is injected by all of the fuel injectors 8 and 9, and, thus, all of the cylinders are fired.

As mentioned above, when the engine is operating under a light load, the shut-off valve 4 is closed, and the recirculation control valve 7 is open. As a result, since the exhaust gas is recirculated into the first cylinder group A via the exhaust-gas recirculation passage 6, it is possible to prevent pumping loss in the first cylinder group A from occurring. In addition, at this time, since the cylinders of the second cylinder group B operate under a heavy load, it is possible to improve the specific fuel consumption.

In such a split engine, however, at the time of changing the number of cylinders to be fired, control of the engine is the most difficult and various problems occur. For example, in the split engine illustrated in FIG. 1, when the operating state of the engine is changed from a light load to a heavy load, first, the recirculation control valve 7 closes. Then, the shut-off valve 4 abruptly opens, and the injection of fuel into the first cylinder group A is started. However, when the opening speed of the throttle valve 3 is low, that is, when the engine is gently accelerated, if the shut-off valve 4 abruptly opens, the abrupt increase in the output torque of the engine provides a chock for a driver. This results in a problem in that the drivability of a vehicle deteriorates. Contrary to this, when the opening speed of the throttle valve 3 is high, that is, when the engine is abruptly accelerated, if the shut-off valve 4 opens after the recirculation control valve 7 closes, it takes a long time until the shut-off valve 4 opens after the accelerating operation of the engine is started. This results in a problem in that a good accelerating operation cannot be obtained.

SUMMARY OF THE INVENTION

An object of the present invention is to provide a split engine capable of gently changing the output torque of the engine when the engine is gently accelerated and obtaining a good accelerating operation when the engine is abruptly accelerated.

According to the present invention, there is provided a split engine having a plurality of cylinders which are divided into a first cylinder group and a second cylinder group, said engine comprising: a first intake passage having an inlet and an outlet connected to said first cylinder group; a second intake passage having an inlet and an outlet connected to said second cylinder group, the inlet of said first intake passage being connected to said second intake passage and the inlet of said second intake passage being open to the outside air; an exhaust passage connected to said first cylinder group; a manually operated throttle valve arranged in the inlet of said second intake passage; an exhaust-gas recirculation passage interconnecting said exhaust passage to said first intake passage; a recirculation control valve, arranged in said exhaust-gas recirculation passage, for controlling the flow area of said exhaust-gas recirculation passage; first detecting means for detecting the level of the load of the engine and for producing an output signal representing the level of the load of the engine; second detecting means for detecting the opening speed of said throttle valve and producing an output signal representing the opening speed of said throttle valve; third detecting means for detecting the position of said recirculation control valve and for producing output signals indicating that the closing operation of said recirculation control valve is started and completed; electronic control means for producing control signals in response to the output signals of said first detecting means, said second detecting means and said third detecting means; fuel supply means, actuated in response to a control signal of said electronic control means, for feeding fuel into only said second cylinder group when the level of the load of the engine is lower than a predetermined level and for feeding fuel into both of said cylinder groups when the level of the load of the engine is higher than the predetermined level; first actuating means operated in response to a control signal of said electronic control means and opening said recirculation control valve when the level of the load of the engine is lower than the predetermined level; a shut-off valve, arranged in the inlet of said first intake passage, for controlling the flow area of the inlet of said first intake passage; and second actuating means operated in response to a control signal of said electronic control means and opening said shut-off valve when the closing operation of said recirculation control valve is completed in the case where the level of the load of the engine becomes higher than the predetermined level, and where the opening speed of said throttle valve is lower than a predetermined first reference speed, said second actuating means opening said shut-off valve when the closing operation of said recirculation control valve is started in the case where the level of the load of the engine becomes higher than the predetermined level, and where the opening speed of said throttle valve is higher than the predetermined first reference speed.

The present invention may be more fully understood from the description of a preferred embodiment of the invention, set forth below, together with the accompanying drawings.

BRIEF DESCRIPTION OF THE DRAWINGS

In the drawings:

FIGS. 4A and 4B are a circuit diagram of the electronic control unit illustrated in FIG. 3;

FIGS. 12A and 12B are a flow chart illustrating the operation of the electronic control unit.

DESCRIPTION OF THE PREFERRED EMBODIMENT

Figure 1:
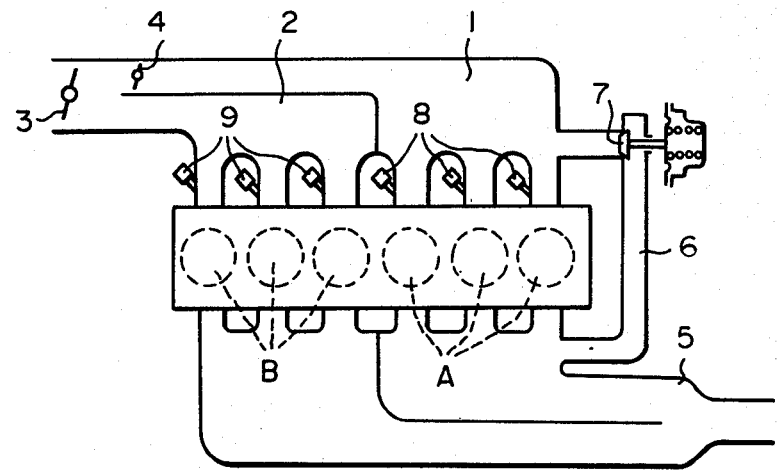
FIG. 1 is a schematically illustrated plan view of a prior art engine.
Figure 2:
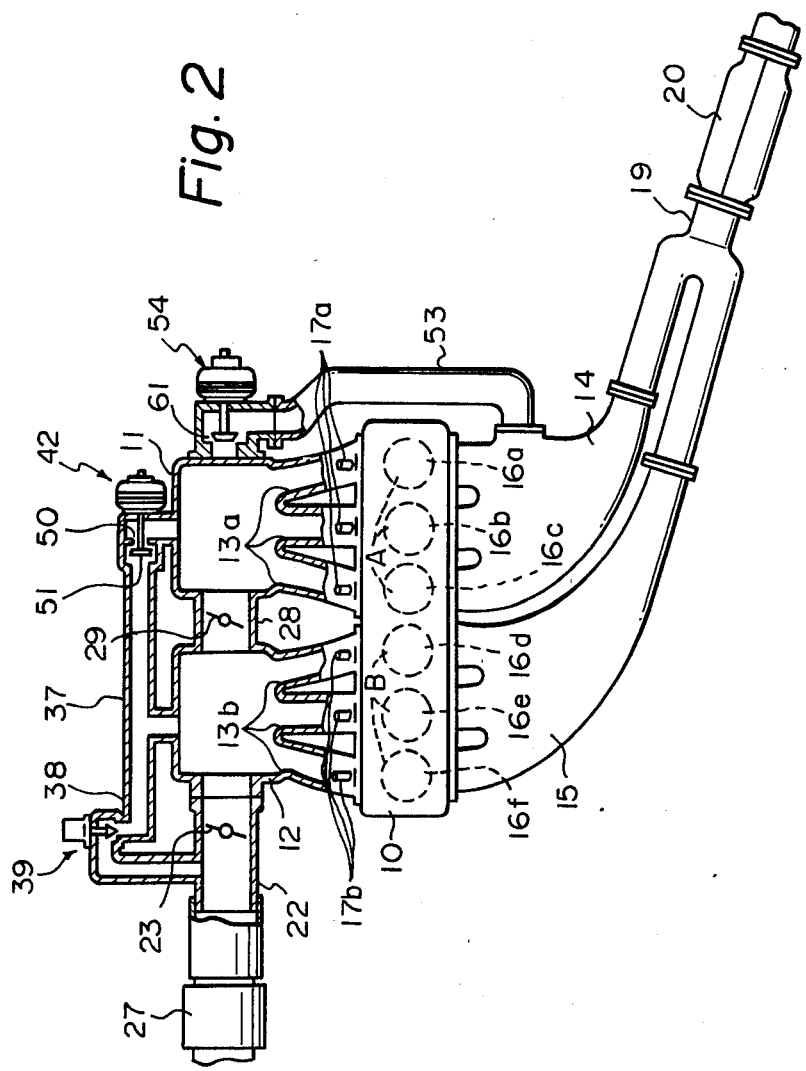
FIG. 2 is a plan view of an engine according to the present invention.

Referring to FIG. 2, reference numeral 10 designates an engine body, 11 a first surge tank, 12 a second surge tank, and 13a separate first pipes connected to the first surge tank 11; 13b designates separate second pipes connected to the second surge tank 12, 14 a first exhaust manifold, and 15 a second exhaust manifold; and 16a, 16b, 16c, 16d, 16e, and 16f designate a No. 1 cylinder, a No. 2 cylinder, a No. 3 cylinder, a No. 4 cylinder, a No. 5 cylinder, and a No. 6 cylinder, respectively. The cylinders 16a, 16b, 16c, 16d, 16e, and 16f are divided into a first cylinder group A consisting of the cylinders 16a, 16b, and 16c and a second cylinder group B consisting of the cylinders 16d, 16e and 16f.

As is illustrated in FIG. 2, the first surge tank 11 and the first exhaust manifold 14 are connected to the first cylinder group A, and the second surge tank 12 and the second exhaust manifold 15 are connected to the second cylinder group B.

Figure 3:
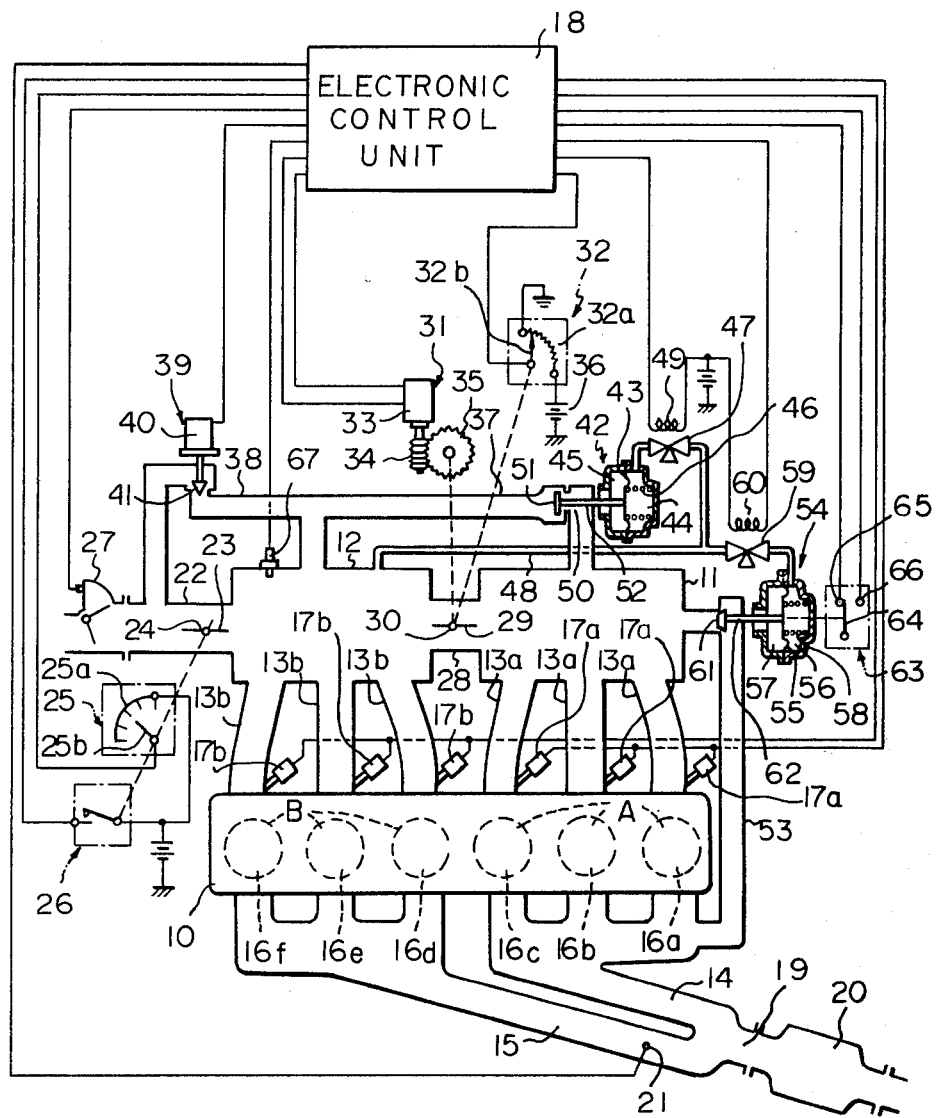
FIG. 3 is a schematically illustrated plan view of the engine illustrated in FIG. 2.

As is illustrated in FIGS. 2 and 3, fuel injectors 17a are mounted on first pipes 13a of the first surge tank 11, and fuel injectors 17b are mounted on second pipes 13b of the second surge tank 12. The solenoids of the fuel injectors 17a and 17b are connected to an electronic control unit 18. The first exhaust manifold 14 and the second exhaust manifold 15 are joined to each other and are connected to a single collection pipe 19. The outlet of the collection pipe 19 is connected to a three-way catalytic converter 20.

As is illustrated in FIG. 3, an oxygen concentration detector 21 (hereinafter referred to as an O₂ sensor) is arranged in the second exhaust manifold 15 and is connected to the electronic control unit 18. An intake duct 22 is attached to the second surge tank 12, and a throttle valve 23 is arranged in the intake duct 22. The throttle valve 23 is connected to the accelerator (not shown). A throttle sensor 25 and an idle switch 26 are connected to a valve shaft 24 of the throttle valve 23. The throttle sensor 25 comprises a comb-shaped stationary terminal 25a and a rotary terminal 25b, which is rotatable together with the throttle valve 23. The throttle sensor 25 produces an output signal every each time the rotary terminal 25b faces one of the teeth of the comb-shaped stationary terminal 25a. Consequently, as the opening speed or the closing speed of the throttle valve 23 is increased, the time interval of the generation of the output signals of the throttle sensor 25 becomes short, and, thus, the opening speed and the closing speed of the throttle valve 23 can be calculated from the output signals of the throttle sensor 25. The idle switch 26 is turned on when the throttle valve 23 is at idle. The throttle sensor 25 and the idle switch 26 are connected to the electronic control unit 18. An airflow meter 27 is attached to the inlet of the intake duct 22 and is connected to the electronic control unit 18.

The first surge tank 11 and the second surge tank 12 are interconnected to each other via a connecting pipe 28, which is formed in one piece thereon, and a shut-off valve 29 is arranged in the connecting pipe 28. The valve shaft 30 of the shut-off valve 29 is connected, on the one hand, to a drive apparatus 31 and, on the other hand, to a valve position sensor 32. The drive apparatus 31 comprises a DC motor 33, a worm gear 34 fixed to the drive shaft of the DC motor 33, and a worm wheel 35 engaging with the worm gear 34 and fixed to the valve shaft 30 of the shut-off valve 29. Consequently, it is understood that when the DC motor 33 is operated, the shut-off valve 29 is rotated.

The valve position sensor 32 comprises a stationary resistor 32a and a movable contact 32b, which rotates together with the shut-off valve 29 while contacting the stationary resistor 32a. One end of the stationary resistor 32a is connected to a power source 36, and the other end of the stationary resistor 32a is grounded. Consequently, it is understood that the voltage, which is proportional to the degree of opening of the shut-off valve 29, is produced at the movable contact 32b. The DC motor 33 and the valve position sensor 32 are connected to the electronic control unit 18.

The first surge tank 11 is also connected to the second surge tank 12 via a bypass pipe 37. In addition, the bypass pipe 37 is connected via an auxiliary air supply pipe 38 to the interior of the intake duct 22 at a position located upstream of the throttle valve 23. A valve unit 39 for controlling the idle speed of the engine is arranged in the auxiliary air supply pipe 38. The valve unit 39 comprises a stepping motor 40 actuated in response to the output signal of the electronic control unit 18 and a flow-control valve 41 driven by the stepping motor 40.

When the engine is idling, the amount of air flowing within the auxiliary air supply pipe 38 is controlled by the flow-control valve 41 so that the idle speed of the engine is kept constant. A bypass control valve apparatus 42 is arranged in the bypass pipe 37. The bypass control valve apparatus 42 comprises a vacuum chamber 44 and an atmospheric pressure chamber 45 which are separated by a diaphragm 43, and a compression spring 46 for biasing the diaphragm 43 is inserted in the vacuum chamber 44. The vacuum chamber 44 is connected to the second surge tank 12 via a first electromagnetic valve 47 and a vacuum conduit 48. In addition, the solenoid 49 of the first electromagnetic valve 47 is connected to the electronic control unit 18. A valve port 50 is formed in the bypass pipe 37, and a valve body 51 for controlling the opening operation of the valve port 50 is arranged in the bypass pipe 37. The valve body 51 is connected to the diaphragm 43 via a valve rod 52.

The first exhaust manifold 14 and the first surge tank 11 are interconnected to each other via an exhaust-gas recirculation passage 53, and a recirculation control valve 54 is arranged in the exhaust-gas recirculation passage 53. The recirculation control valve 54 comprises a vacuum chamber 56 and an atmospheric pressure chamber 57, which are separated by a diaphragm 55, and a compression spring 58 for biasing the diaphragm 55 is inserted in the vacuum chamber 56. The vacuum chamber 56 is connected to the second surge tank 12 via a second electromagnetic valve 59 and the vacuum conduit 48, and the solenoid 60 of the second electromagnetic valve 59 is connected to the electronic control unit 18. A valve body 61 for controlling the flow area of the exhaust-gas recirculation passage 53 is arranged in the exhaust-gas recirculation passage 53 and is connected to the diaphragm 55 via a valve rod 62. In addition, the recirculation control valve 54 is provided with a valve position switch 63. The valve position switch 63 comprises a movable contact 64 connected to the diaphragm 55 and actuated by it and a pair of stationary contacts 65 and 66 which are able to contact the movable contact 64. The stationary contacts 65 and 66 are connected to the electronic control unit 18. The movable contact 64 is connected to the stationary contact 65 when the valve body 61 closes and is connected to the stationary contact 66 when the valve body 61 opens.

As is illustrated in FIG. 3, a vacuum sensor 67 for detecting the level of the load of the engine is arranged in the second surge tank 12 and is connected to the electronic control unit 18. In addition, in order to detect the engine speed, a speed sensor 72 (FIG. 4) is mounted on the engine body 10.

Figure 4B:
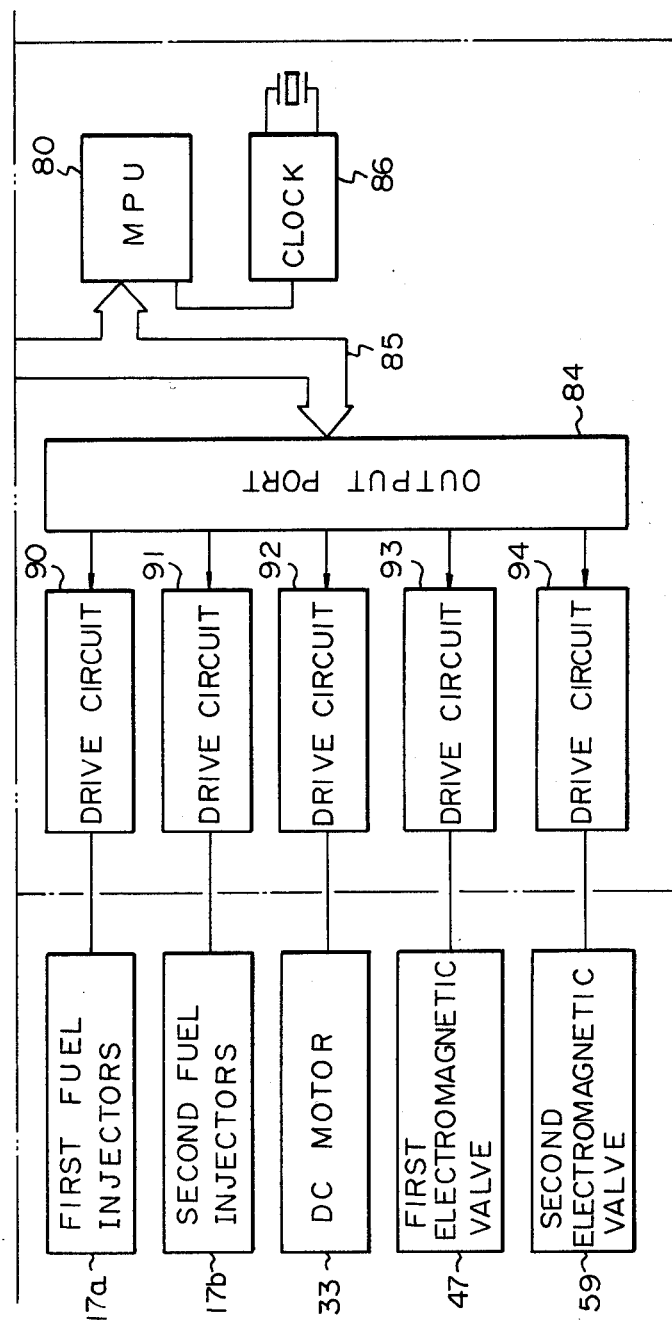

FIG. 4 illustrates the electronic control unit 18. Referring to FIG. 4, the electronic control unit 18 is constructed as a digital computer and comprises a microprocessing unit (MPU) 80 for carrying out arithmetic and logic processing, a random-access memory (RAM) 81, a read-only memory (ROM) 82 for storing a predetermined control program and an arithmetic constant therein, an input port 83, and an output port 84. The MPU 80, the RAM 81, the ROM 82, the input port 83, and the output port 84 are interconnected to each other via a bidirectional bus 85. In addition, the electronic control unit 18 comprises a clock generator 86 for generating various clock signals.

As is illustrated in FIG. 4, the speed sensor 72, the idle switch 26, the throttle sensor 25, and the valve position switch 63 are connected to the input port 83. The airflow meter 27, the vacuum sensor 67, and the valve position sensor 32 are connected to the input port 83 via corresponding AD converters 87, 88, and 95, and the $O_2$ sensor 21 is connected to the port 83 via a comparator 89.

The airflow meter 27 produces an output voltage which is proportional to the amount of air fed into the intake duct 22. The output voltage of the airflow meter 27 is converted into the corresponding binary code in the AD converter 87 and then the binary code is input into the MPU 80 via the input port 83 and the bus 85. The speed sensor 72 produces continuous pulses at a frequency which is proportional to the engine speed, and the continuous pulses are input into the MPU 80 via the input port 83 and the bus 85. The $O_2$ sensor 21 produces an output voltage of about 0.1 volts when the air-fuel ratio of the fuel mixture fed into the second cylinder group B becomes larger than the stoichiometric air-fuel ratio and produces an output voltage of about 0.9 volts when the air-fuel ratio of the fuel mixture fed into the second cylinder group B becomes smaller than the stoichiometric air-fuel ratio.

The output voltage of the $O_2$ sensor 21 is compared with a reference voltage of about 0.5 volts in the comparator 89. At this time, if the air-fuel ratio of the fuel mixture is larger than the stoichiometric air-fuel ratio, an output signal is produced at one of the output terminals of the comparator 89, and if the air-fuel ratio of the fuel mixture is smaller than the stoichiometric air-fuel ratio, an output signal is produced at the other output terminal of the comparator 89. The output signal of the comparator 89 is input into the MPU 80 via the input port 83 and the bus 85.

The vacuum sensor 67 produces an output voltage which is proportional to the level of vacuum in the second surge tank 12. The output voltage of the vacuum sensor 67 is converted to the corresponding binary code in the AD converter 88 and then the binary code is input into the MPU 80 via the input port 83 and the bus 85.

The valve position sensor 32 produces an output voltage which is proportional to the degree of the opening of the shut-off valve 29. The output voltage of the valve position sensor 32 is converted to the corresponding binary code in the AD converter 95 and the binary code is input into the MPU 80 via the input port 83 and the bus 85. In addition, the output signals of the idle switch 26, the throttle sensor 25, and the valve position switch 63 are input into the MPU 80 via the input port 83 and the bus 85.

The first fuel injectors 17a, the second fuel injectors 17b, the DC motor 33, the first electromagnetic valve 47, and the second electromagnetic valve 59 are connected to the output port 84 via corresponding drive circuits 90, 91, 92, 93, and 94. Data for actuating the first fuel injectors 17a, the second fuel injectors 17b, the DC motor 33, the first electromagnetic valve 47, and the second electromagnetic valve 59 is written into the output port 84.

Figure 7:
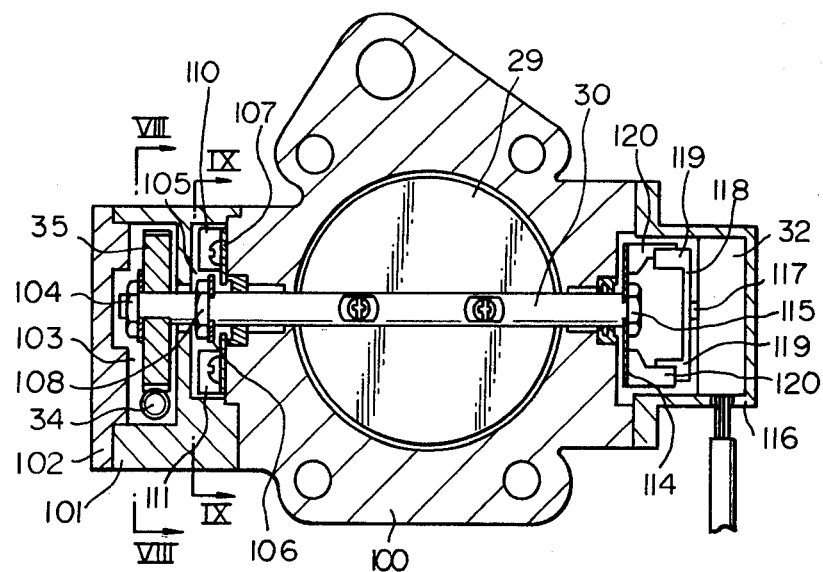
FIG. 7 is a cross-sectional side view a shut-off valve apparatus.
Figure 8:
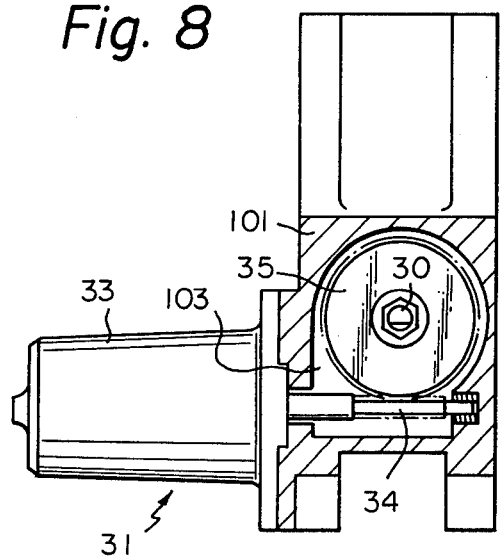
FIG. 8 is a cross-sectional view taken along the line VIII—VIII in FIG. 7.
Figure 9:
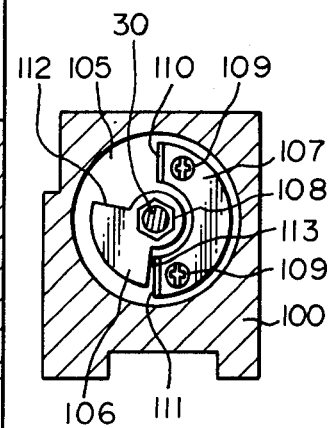
FIG. 9 is a cross-sectional view taken along the line IX—IX in FIG. 7.

FIGS. 7 through 9 illustrate the drive apparatus 31 and the shut-off valve 29 illustrated in FIG. 3. Referring to FIGS. 7 through 9, the valve shaft 30 of the shut-off valve 29 is supported by a housing 100 which forms a portion of the connecting pipe 28 (FIG. 3), and the opposed ends of the valve shaft 30 project outwardly from the housing 100. One end of the valve shaft 30 extends through a drive apparatus housing 101 having an I-shaped cross section and being fixed to the housing 100, and the outer side of the housing 101 is covered by a cover member 102. The worm wheel 35 is arranged in the interior space 103 formed between the housing 101 and the cover member 102 and is fixed to the valve shaft 30 with a nut 104. In addition, the DC motor 33 is fixed to the housing 101, and the worm gear 34, engaging with the worm wheel 35, is fixed to the drive shaft of the DC motor 33. The worm gear 34 and the worm wheel 35 together form a reduction gear.

As is illustrated in FIGS. 7 and 9, an arm 106 and a stop member 107 are arranged in the interior space 105 formed between the housings 101 and 100. The arm 106 has a sector shape and is fixed to the valve shaft 30 with a nut 108. The stop member 107 has an approximately semicircular shape and is fixed to the housing 100 with a pair of bolts 109. The stop member 107 has at its opposite ends end portions 110 and 111, which are outwardly bent and are arranged so that they are engageable with the sector-shaped arm 106.

The sector-shaped arm 106 and the stop member 107 serve to determine the wide open position and the closed position of the shut-off valve 29. That is, when the end face 112 of the arm 106 abuts against the bent end portion 110, the shut-off valve 29 is in the wide open position and when the end face 113 of the arm 106 abuts against the bent end portion 111, the shut-off valve 29 is in the closed position.

As is illustrated in FIG. 7, an arm 114 is fixed to the end portion of the valve shaft 30, which end portion is located opposite the worm wheel 35, with a nut 115. The arm 114 is covered by a cover member 116 fixed to the housing 100, and the valve position sensor 32 is arranged in the cover member 116. An arm 118 is fixed to a rotary shaft 117 of the valve position sensor 32 and has projecting end portions 119 at the opposed ends thereof. In addition, the arm 114 has, at its opposed ends, projecting end portions 120 which engage with the projecting end portions 119. Consequently, rotation of the valve shaft 30 causes rotation of the rotary shaft 117 of the valve position sensor 32, and, thus, the position of the shut-off valve 29 can be detected by the valve position sensor 32.

Figure 5:
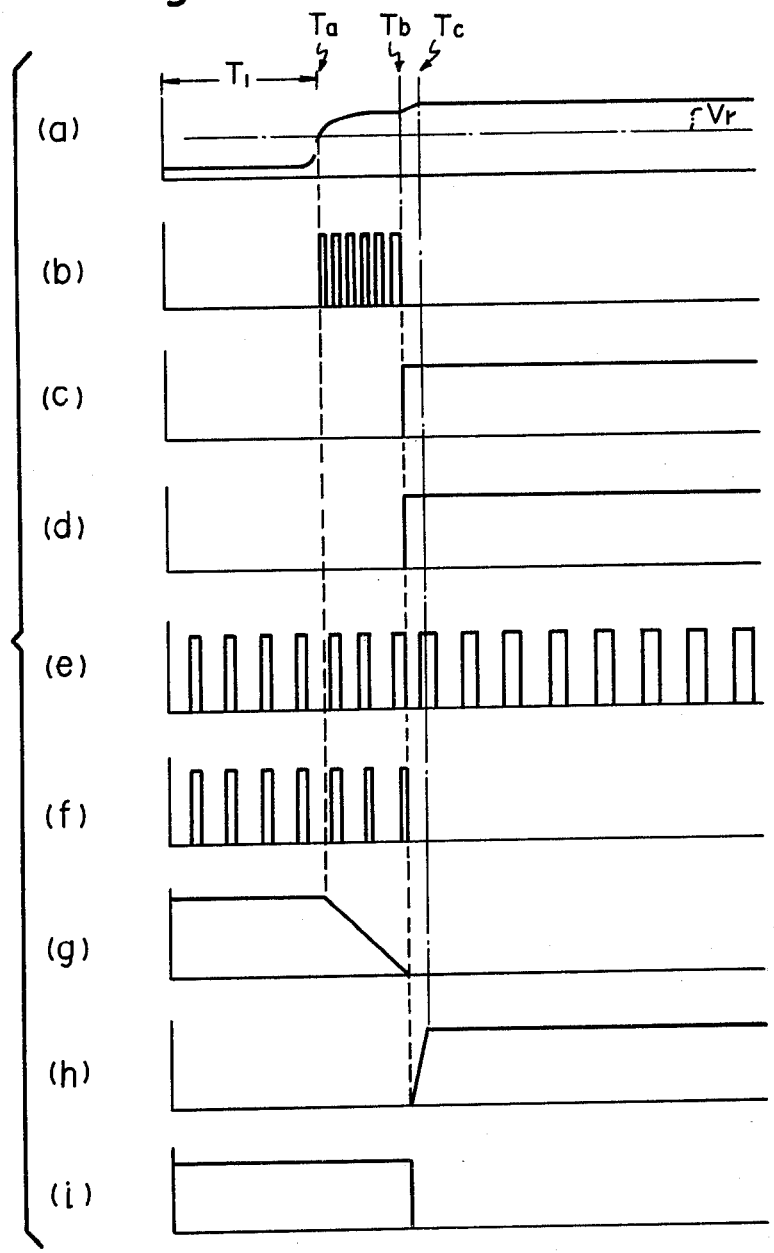
FIG. 5 is a diagram illustrating the control method according to the present invention.
Figure 6:
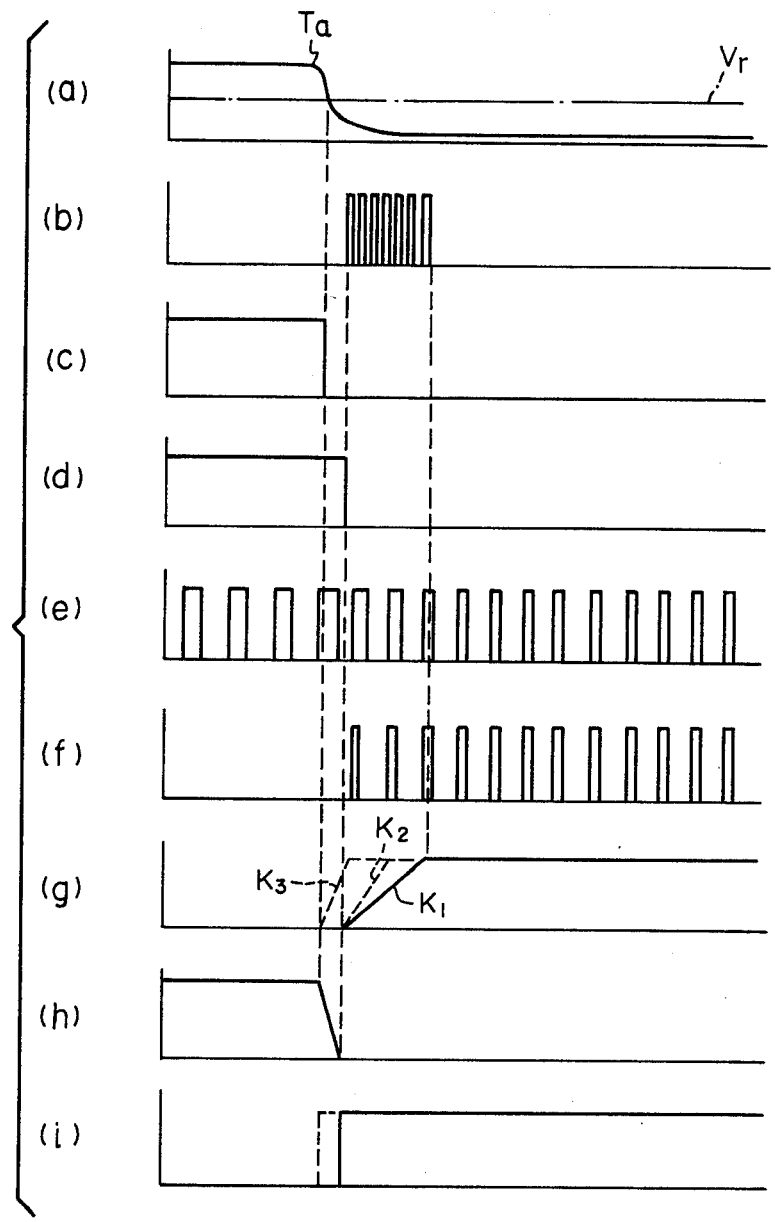
FIG. 6 is a diagram also illustrating the control method according to the present invention.

FIGS. 5 and 6 illustrate the basic operation of the split engine according to the present invention.

In FIGS. 5 and 6:

(a) indicates the output voltage of the vacuum sensor 67.

(b) indicates a drive pulse supplied to the DC motor 33.

(c) indicates a control voltage supplied to the solenoid 60 of the second electromagnetic valve 59.

(d) indicates a control voltage supplied to the solenoid 49 of the first electromagnetic valve 47.

(e) indicates a control pulse supplied to the fuel injectors 17b of the second cylinder group B.

(f) indicates a control pulse supplied to the fuel injectors 17a of the first cylinder group A.

(g) indicates the degree of opening of the shut-off valve 29.

(h) indicates the degree of opening of the valve body 61 of the recirculation control valve 54.

(i) indicates the degree of opening of the valve body 51 of the bypass control valve apparatus 42.

FIG. 5 illustrates a case wherein the operating state of the engine is changed from a heavy load to a light load, and FIG. 6 illustrates a case wherein the operating state of the engine is changed from a light load to a heavy load.

In FIG. 5, section $T_1$ indicates a state where the output voltage of the vacuum sensor 67 is low, that is, the engine is operating under a heavy load. At this time, the DC motor 33 is not driven, as is illustrated in FIG. 5 (b), and the shut-off valve 29 is in the wide open position, as is illustrated in FIG. 5 (g). In addition, at this time, the solenoid 60 of the second electromagnetic valve 59 is de-energized, as is illustrated in FIG. 5 (c), and, thus, the vacuum chamber 56 of the recirculation control valve 54 is open to the atmosphere via the second electromagnetic valve 59. As a result, the diaphragm 55 moves towards the atmospheric pressure chamber 57, and, thus, the valve body 61 shuts off the exhaust-gas recirculation passage 53, as is illustrated in FIG. 5 (h). Furthermore, at this time, the solenoid 49 of the first electromagnetic valve 47 is de-energized, as is illustrated in FIG. 5 (d), and, thus, the vacuum chamber 44 of the bypass control valve apparatus 42 is open to the atmosphere via the first electromagnetic valve 47. As a result, the diaphragm 43 moves towards the atmospheric pressure chamber 45, and, thus, the valve body 51 of the bypass control valve device 42 opens the valve port 50 to the maximum extent, as is illustrated in FIG. 5 (i).

On the other hand, in section $T_1$ of FIG. 5, the engine speed is calculated in the MPU 80 (FIG. 4) from the output pulse of the speed sensor 72, and, in addition, the basic fuel injection period is calculated in the MPU 80 from the calculated engine speed and the output signal of the airflow meter 27. In a case wherein the three-way catalytic converter 20 is used, as is illustrated in FIG. 3, when the air-fuel ratio of the fuel mixture fed into the second cylinder group B becomes equal to the stoichiometric air-fuel ratio, the purifying efficiency of the three-way catalytic converter 20 reaches a maximum. Consequently, in the MPU 80, the actual fuel injection period is obtained by correcting the basic fuel injection period on the basis of the output signal of the $O_2$ sensor 21 so that the air-fuel ratio of the fuel mixture fed into the second cylinder group B approaches the stoichiometric air-fuel ratio. Data indicating the actual fuel injection period is written into the output port 84, and the control pulse, corresponding to the data and illustrated in FIG. 5 (e) and (f), is supplied to the fuel injectors 17a of the first cylinder group A and the fuel injectors 17b of the second cylinder group B. Consequently, when the engine is operating under a heavy load, fuel is injected from all of the fuel injectors 17a and 17b.

In the operating state of the engine is changed from a heavy load to a light load at the time $T_a$ in FIG. 5, the output voltage of the vacuum sensor 67 is abruptly increased, as is illustrated in FIG. 5 (a). In the MPU 80, when the output voltage of the vacuum sensor 67 exceeds the reference voltage $V_r$ (FIG. 5 (a)), it is determined that the engine is operating under a light load. As a result, a drive signal, that is, the continuous pulses illustrated in FIG. 5 (b), is supplied to the DC motor 33. At this time, the DC motor 33 rotates at a speed which is proportional to the mean voltage of the continuous pulses. As a result, shut-off valve 29 is gradually opened, as is illustrated in FIG. 5 (g). Then the shut-off valve 29 is closed at the time $T_b$ in FIG. 5. In the MPU 80, if it is determined, on the basis of the output signal of the second comparator 97, that the shut-off valve 29 is closed, various kinds of data, such as data for stopping the injection of fuel by the first fuel injectors 17a, data for increasing the amount of fuel injected by the second fuel injectors 17b, and data for energizing the solenoids 49 and 60 of the electromagnetic valves 47 and 59, is written into the output port 84. As a result, at the time $T_b$ in FIG. 5, the amount of fuel injected by the fuel injectors 17b of the second cylinder group B is increased, as is illustrated in FIG. 5 (e), and the injection of fuel by the fuel injectors 17a of the first cylinder group A is stopped, as is illustrated in FIG. 5 (f). In addition, since the solenoid 49 of the first electromagnetic valve 47 is energized, the vacuum chamber 44 of the bypass control valve apparatus 42 is connected to the second surge tank 12 via the vacuum conduit 48. As a result, the diaphragm 43 moves towards the vacuum chamber 44, and, thus, the valve body 51 closes the valve port 50, as is illustrated in FIG. 5 (i). Furthermore, at the time $T_b$ in FIG. 5, since the solenoid 60 of the second electromagnetic valve 59 is energized, as mentioned above, the vacuum chamber 56 of the recirculation control valve 54 is connected to the second surge tank 12 via the vacuum conduit 48. As a result, since the diaphragm 55 moves towards the vacuum chamber 56, the valve body 61 opens the exhaust-gas recirculation passage 53. This valve body 61 opens to the maximum extent at the time $T_c$ in FIG. 5.

As mentioned above, since the valve body 51 shuts off the bypass pipe 37 as soon as the valve body 61 of the recirculation control valve 54 opens the exhaust-gas recirculation passage 53, there is no danger of the exhaust gas, which flows into the first surge tank 11 from the exhaust-gas recirculation passage 53, flowing into the second surge tank 12.

When the throttle valve 23 opens, and the operating state of the engine is changed from a light load to a heavy load, the opening timing and the opening speed of the shut-off valve 29 are changed in accordance with the opening speed of the throttle valve 23. This is hereinafter described with reference to FIGS. 10 through 12.

Figure 10:
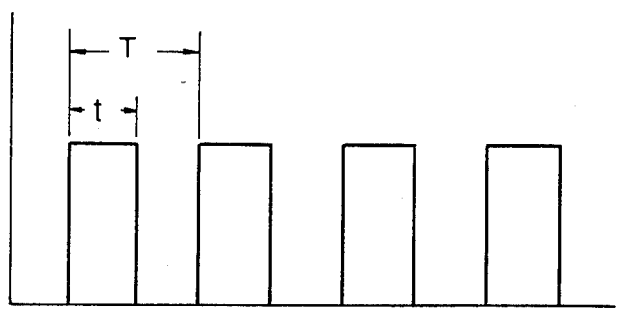
FIG. 10 is a diagram illustrating the drive pulse of a direct current (DC) motor.

FIG. 10 illustrates drive pulses supplied to the DC motor 33. In FIG. 10, the duty cycle of the drive pulses is indicated by t/T. If the duty cycle t/T becomes large, the mean value of the voltage supplied to the DC motor 33 becomes large. As a result of this, since the rotating speed of the DC motor 33 becomes high, the opening speed of the shut-off valve 29 becomes high.

Figure 11:
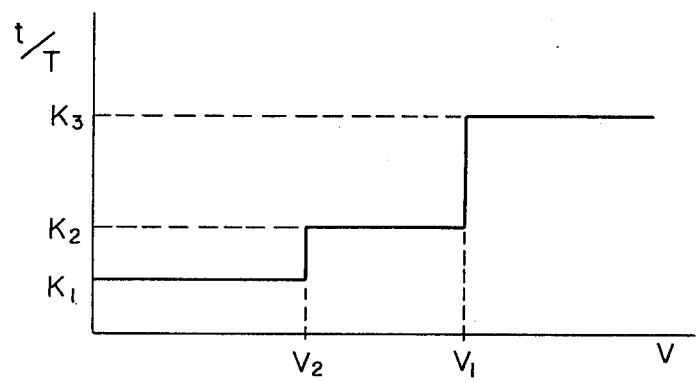
FIG. 11 is a diagram illustrating the relationship between the duty cycle and the opening speed of the throttle valve.

FIG. 11 illustrates the relationship between the duty cycle t/T and the opening speed V of the throttle valve 23. As is understood from FIG. 11, the duty cycle t/T becomes equal to $K_3$ when the opening speed V of the throttle valve 23 is higher than $V_1$, and the duty cycle t/T becomes equal to $K_2$ when the opening speed V of the throttle valve 23 is in the range between $V_1$ and $V_2$. In addition, the duty cycle t/T becomes equal to $K_1$ when the opening speed V of the throttle valve 23 is lower than $V_2$. Consequently, the duty cycle t/T becomes large as the opening speed of the throttle valve 23 becomes high. The relationship between the duty cycle t/T and the opening speed V of the throttle valve 23, illustrated in FIG. 11, is stored in the ROM 82 (FIG. 4) in the form of a data table.

The operation of the electronic control unit 18 is hereinafter described with reference to FIG. 12. Referring to FIG. 12, first, in step 150, the opening speed V of the throttle valve 23 is calculated from the output signal of the throttle sensor 25. Then, in step 151, from the output signal of the vacuum sensor 67, it is determined whether or not all the cylinders or only the second cylinder group B should be fired. When all the cylinders should be fixed, the routine goes to step 152. In step 152, it is determined whether the opening speed V of the throttle valve 23 is higher than $V_1$ (FIG. 11). When the opening speed of the throttle valve 23 is not higher than $V_1$, the routine goes to step 153. In step 153, it is determined whether or not the opening speed V of the throttle valve 23 is higher than $V_2$ (FIG. 11). When the opening speed V of the throttle valve 23 is not higher than $V_2$, $K_1$ is put into the duty cycle t/T and, then, the routine goes to step 155. In step 155, it is determined whether or not the stationary contact 65 of the valve position switch 63 (FIG. 3) is in contact with the movable contact 64. When the stationary contact 66 is in contact with the movable contact 64, the routine goes to step 156, and data for driving the DC motor 33 (FIG. 3) is written in the output port 84. Then, in step 157, data for de-energizing the solenoid 49 of the first electromagnetic valve 47 is written in the output port 84. FIG. 6 illustrates the above-mentioned sequential processing. That is, if the above-mentioned sequential processing is started, first, since the solenoid 60 of the second electromagnetic valve 59 is de-energized, as is illustrated in FIG. 6 (c), the valve body 61 of the recirculation control valve 54 shuts off the exhaust-gas recirculation passage 53, as is illustrated in FIG. 6 (h). When the valve body 61 completely shuts off the exhaust-gas recirculation passage 53 and, thus, the movable contact 64 of the valve position switch 63 comes into contact with the stationary contact 65, various types of data, such as data for starting the injection of fuel by the first fuel injectors 17a, as is illustrated in FIG. 6 (f), data for driving the DC motor 33, as is illustrated in FIGS. 6 (b) and (c), and data for energizing the solenoid 49 of the first electromagnetic valve 47, as is illustrated in FIG. 6 (i), is written into the output port 84. Consequently, when the valve body 61 of the recirculation control valve 54 completely shuts off the exhaust-gas recirculation passage 53, the injection of fuel by the first fuel injectors 17a is started, as is illustrated in FIG. 6 (f). In addition, at this time, the shut-off valve 29 gradually opens at a speed determined by the duty cycle $K_1$, as illustrated in FIG. 6 (g), and the valve body 51 of the bypass control valve apparatus 42 instantaneously opens.

In step 153 in FIG. 12, if it is determined that the opening speed V of the throttle valve 23 is higher than $V_2$ (FIG. 11), the routine goes to step 158, and $K_2$ (FIG. 11) is put into the duty cycle t/T. Consequently, at this time, the shut-off valve 29 opens at a speed illustrated by the dotted line $K_2$ and being higher than the speed $K_1$.

In step 152 in FIG. 152, if it is determined that the opening speed V of the throttle valve 23 is higher than $V_1$ (FIG. 11), the routine goes to step 159, and $K_3$ (FIG. 11) is put into the duty cycle t/T. Then, in step 160, it is determined whether or not the stationary contact 66 of the valve position switch 63 is in contact with the movable contact 64. If the stationary contact 66 is disconnected from the movable contact 64, the routine goes to step 156, and the DC motor 33 is driven. Then, in step 157, the solenoid 49 of the first electromagnetic valve 47 is de-energized. Consequently, at this time, the shut-off valve 29 opens at a speed illustrated by the dotted line $K_3$ in FIG. 6 (g) and being higher than the speed $K_2$ as soon as the closing operation of the recirculation control valve 54 is started. In addition, as illustrated by the dotted line in FIG. 6 (i), the valve body 51 of the bypass control valve apparatus 42 instantaneously opens so soon as the closing operation of the recirculation control valve 54 is started. Furthermore, the injection of fuel into the first cylinder group A is started as soon as the closing operation of the recirculation control valve 54 is started.

According to the present invention, when the opening speed of the throttle valve 23 is relatively low, that is, when the engine is gently accelerated, the shut-off valve 29 slowly opens. As a result of this, since the output torque of the engine is gradually and smoothly increased, it is possible to obtain a good drivability of a vehicle. Contrary to this, when the opening speed of the throttle valve 23 is high, that is, when the engine is abruptly accelerated, the shut-off valve 29 rapidly opens as soon as the closing operation of the recirculation control valve 54 is started, that is, the accelerating operation of the engine is started. This makes it possible to obtain a good accelerating operation of the engine. In addition, in the present invention, the valve body 51 of the bypass control valve apparatus 42 instantaneously opens as soon as the accelerating operation of the engine is started. Consequently, since air is instantaneously fed into the first surge tank 11 from the bypass pipe 37 as soon as the accelerating operation of the engine is started, there is no danger that a misfire occurs in the first cylinder group A.

While the invention has been described with reference to specific embodiment chosen for the purpose of illustration, it is apparent that numerous modifications could be made thereto by those skilled in the art without departing from the basic concept and scope of the invention.

We claim:

1. A split engine having a plurality of cylinders which are divided into a first cylinder group and a second cylinder group, said engine comprising:
   a first intake passage having an inlet and an outlet connected to said first cylinder group;
   a second intake passage having an inlet and an outlet connected to said second cylinder group, the inlet of said first intake passage being connected to said second intake passage and the inlet of said second intake passage being open to the outside air;
   an exhaust passage connected to said first cylinder group;
   a manually operated throttle valve arranged in the inlet of said second intake passage;
   an exhaust-gas recirculation passage interconnecting said exhaust passage to said first intake passage;
   a recirculation control valve, arranged in said exhaust-gas recirculation passage, for controlling the flow area of said exhaust-gas recirculation passage;
   first detecting means for detecting the level of the load of the engine and for producing an output signal representing the level of the load of the engine;
   second detecting means for detecting the opening speed of said throttle valve and producing an output signal representing the opening speed of said throttle valve;
   third detecting means for detecting the position of said recirculation control valve and for producing output signals indicating that the closing operation of said recirculation control valve is started and completed;
   electronic control means for producing control signals in response to the output signals of said first detecting means, said second detecting means, and said third detecting means;
   fuel supply means, actuated in response to a control signal of said electronic control means, for feeding fuel into only said second cylinder group when the level of the load of the engine is lower than a predetermined level and for feeding fuel into both of said cylinder groups when the level of the load of the engine is higher than the predetermined level;
   first actuating means operated in response to a control signal of said electronic control means and opening said recirculation control valve when the level of the load of the engine is lower than the predetermined level;
   a shut-off valve, arranged in the inlet of said first intake passage, for controlling the flow area of the inlet of said first intake passage; and
   second actuating means operated in response to a control signal of said electronic control means and opening said shut-off valve when the closing operation of said recirculation control valve is completed in the case where the level of the load of the engine becomes higher than the predetermined level, and where the opening speed of said throttle valve is lower than a predetermined first reference speed, said second actuating means opening said shut-off valve when the closing operation of said recirculation control valve is started in the case where the level of the load of the engine becomes higher than the predetermined level, and where the opening speed of said throttle valve is higher than the predetermined first reference speed.

2. A split engine according to claim 1, where said second actuating means opens said shut-off valve at a first opening speed in the case where the opening speed of said throttle valve is lower than the predetermined first reference speed, said second actuating means opening said shut-off valve at a second opening speed, which is higher than said first opening speed, in the case where the opening speed of said throttle valve is higher than the predetermined first reference speed.

3. A split engine according to claim 1, wherein the first opening speed of said shut-off valve is increased in accordance with an increase in the opening speed of said throttle valve.

4. A split engine according to claim 1, wherein said second actuating means comprises a DC motor which is actuated by continuous pulses issued from said electronic control means.

5. A split engine according to claim 1, wherein said third detecting means is a valve position switch which is actuated in response to the movement of said recirculation control valve and which produces the output signals indicating that the closing operation of said recirculation control valve is started and completed.

6. A split engine according to claim 5, wherein said first actuating means comprises a vacuum-operated diaphragm apparatus having a diaphragm, said valve position switch being operated in response to the movement of said diaphragm.

7. A split engine according to claim 1, wherein said second actuating means comprises a valve position sensor for detecting the position of said shut-off valve and for producing an output signal indicating that said shut-off valve closes, said first actuating means actuating said recirculation control valve in response to the output signal of said valve position sensor for starting the operation of opening said recirculation control valve after said shut-off valve closes.

8. A split engine according to claim 1, wherein said first detecting means is a vacuum sensor arranged in said second intake passage for detecting the level of vacuum in said second intake passage.

9. A split engine according to claim 1, wherein said second detecting means is a throttle sensor connected to said throttle valve for producing output pulses at a time interval which is inversely proportional of the opening speed of said throttle valve.

10. A split engine according to claim 1, wherein said fuel supply means starts the supply of fuel into said first cylinder group when the closing operation of said recirculation control valve is completed in the case where the level of the load of the engine becomes higher than the predetermined level, and where the opening speed of said throttle valve is lower than the predetermined first reference speed, said fuel supply means starting the supply of fuel into said first cylinder group when the closing operation of said recirculation control valve is started in the case where the level of the load of the engine becomes higher than the predetermined level, and where the opening speed of said throttle valve is higher than the predetermined first reference speed.

11. A split engine according to claim 10, wherein said fuel supply means comprises a first group of injectors arranged in said first intake passage and a second group of injectors arranged in said second intake passage.

12. A split engine according to claim 1, wherein said engine comprises a bypass passage interconnecting said first intake passage to said second intake passage and a bypass control valve arranged in said bypass passage and actuated in response to a control signal of said electronic control means for shutting off said bypass passage when said recirculation control valve is in the wide open position.

13. A split engine according to claim 12, wherein said bypass control valve opens said bypass passage when the closing operation of said recirculation control valve is completed in the case where the level of the load of the engine becomes higher than the predetermined level, and where the opening speed of said throttle valve is lower than the predetermined first reference speed, said bypass control valve opening said bypass passage when the closing operation of said recirculation control valve is started in the case where the level of the load of the engine becomes higher than the predetermined level, and where the opening speed of said throttle valve is higher than the predetermined first reference speed.

14. A split engine according to claim 12, wherein said second actuating means comprises a valve position sensor for detecting the position of said shut-off valve and for producing an output signal indicating that said shut-off valve closes, said bypass control valve shutting off said bypass passage when said shut-off valve closes.

15. A split engine according to claim 12, wherein said bypass control valve comprises a vacuum-operated diaphragm apparatus.

16. A split engine according to claim 12, wherein said engine comprises an auxiliary air supply passage interconnecting said bypass passage to the inlet of said second intake passage, which is located upstream of said throttle valve.

17. A split engine according to claim 16, wherein said auxiliary air supply passage has a control valve arranged therein for maintaining the engine speed at a predetermined speed at idle.

* * * * *